United States Patent
Laliberté et al.

(10) Patent No.: US 7,513,136 B2
(45) Date of Patent: Apr. 7, 2009

(54) LAMINATION PROCESS AND APPARATUS FOR ALKALI METALS OR ALLOYS THEREOF

(75) Inventors: Richard Laliberté, Ste-Julie (CA); Pierre Sirois, Longueuil (CA); Régis Gagnon, Bromont (CA)

(73) Assignee: Bathium Canada Inc., Boucherville (CA)

( * ) Notice: Subject to any disclaimer, the term of this patent is extended or adjusted under 35 U.S.C. 154(b) by 166 days.

(21) Appl. No.: 10/666,054

(22) Filed: Sep. 22, 2003

(65) Prior Publication Data

US 2005/0061047 A1    Mar. 24, 2005

Related U.S. Application Data

(60) Provisional application No. 60/411,387, filed on Sep. 18, 2002.

(51) Int. Cl.
*B21B 29/00* (2006.01)
*B21B 37/48* (2006.01)
*B21B 37/58* (2006.01)

(52) U.S. Cl. ............... 72/241.8; 72/8.6; 72/11.4; 72/11.8

(58) Field of Classification Search ........... 72/10.6, 72/205, 252.5, 365.2, 366.2, 701, 700, 241.8, 72/241.6, 222, 227, 250, 163, 241.2, 8.6, 72/9.2, 10.3, 11.4, 11.8, 12.3; 29/623.3, 29/623.5
See application file for complete search history.

(56) References Cited

U.S. PATENT DOCUMENTS

| | | | |
|---|---|---|---|
| 1,895,607 A * | 1/1933 | Coe ........................ | 72/241.2 |
| 2,732,591 A * | 1/1956 | Whittum ................... | 72/248 |
| 3,721,113 A | 3/1973 | Hovsepian | |
| 3,795,124 A * | 3/1974 | Diolot ..................... | 72/13.3 |
| 4,134,283 A * | 1/1979 | Noe ........................ | 72/10.3 |
| 4,179,913 A * | 12/1979 | Martt ...................... | 72/205 |
| 4,453,393 A * | 6/1984 | Hino et al. ............... | 72/241.8 |
| 4,458,515 A * | 7/1984 | Imai ....................... | 72/10.5 |
| 4,615,961 A | 10/1986 | McLoughlin et al. | |
| 4,703,641 A * | 11/1987 | Yarita et al. .............. | 72/247 |
| 4,934,306 A * | 6/1990 | Rudolph .................. | 118/58 |

(Continued)

FOREIGN PATENT DOCUMENTS

DE    44 17 274 A    11/1995

(Continued)

OTHER PUBLICATIONS

International Search Report of PCT/CA03/01490 dated Jan. 30, 2004.

*Primary Examiner*—Dana Ross
*Assistant Examiner*—Teresa Bonk
(74) *Attorney, Agent, or Firm*—Osler, Hoskin & Harcourt LLP (57) ABSTRACT

An apparatus for and method of manufacturing lithium or lithium alloy anodes for electrochemical cells by a lamination process wherein a lithium or lithium alloy sheet is reduced into a thin lithium or lithium alloy film. The method and apparatus provide adjustments of the profile defined by the meeting surfaces of a pair of working rollers to compensate for thermal dilation of the working rollers or to compensate for irregular thickness of the lithium or lithium alloy sheet to control the shape and profile of the lithium or lithium alloy film being laminated.

9 Claims, 7 Drawing Sheets

U.S. PATENT DOCUMENTS 5,174,144 A * 12/1992 Kajiwara et al. .............. 72/236
5,528,920 A    6/1996 Bouchard et al.
6,085,567 A * 7/2000 Cattaneo et al. .............. 72/237
6,119,500 A * 9/2000 Ginzburg et al. .............. 72/247

FOREIGN PATENT DOCUMENTS

| DE | 199 26 633 A | 1/2000 |
| JP | 55112114 A * | 8/1980 |
| JP | 59 212104 A | 12/1984 |
| JP | 2000003705 A * | 1/2000 |
| WO | WO 0197989 A1 * | 12/2001 |

* cited by examiner

LAMINATION PROCESS AND APPARATUS FOR ALKALI METALS OR ALLOYS THEREOF

CROSS-REFERENCE TO RELATED APPLICATION

This application claims the priority of U.S. provisional application Ser. No. 60/411,387, filed on Sep. 18, 2002.

FIELD OF THE INVENTION

The present invention relates generally to lithium metal polymer batteries and more specifically to a process and apparatus for laminating sheets of alkali metals or alloys thereof into thin films which may be used as anodes in electrochemical cells preferably with polymer electrolytes.

BACKGROUND OF THE INVENTION

Rechargeable batteries manufactured from laminates of solid polymer electrolytes and thin films anodes and cathodes displays many advantages over conventional liquid electrolytes batteries. These advantages include lower overall battery weight, high power density, high specific energy, longer service life, and environmentally friendly since the danger of spilling toxic liquid into the environment is eliminated.

Solid polymer battery components include positive electrodes, negative electrodes and an insulating material capable of permitting ionic conductivity such as a solid polymer electrolyte sandwiched between the electrodes. The anodes or negative electrodes are usually made of lightweight metals films, such as alkali metals and alloys typically Lithium metal, lithium-aluminum alloys and the like. The composite cathodes or positive electrodes are usually formed of a mixture of active material such as transitional metal oxide, an electrically conductive filler, usually Carbon particles, an ionically conductive polymer electrolyte material and a current collector usually a thin sheet of aluminum. Composite cathode thin films are usually obtained by coating onto a current collector.

The production of thin films of lithium having a thickness lower than 75 mircrometers and in the form of wide bands, for example 10 centimetres or more and in lengths of many hundreds of meters, by means of rapid and reliable processes, faces important technical difficulties which are attributable to the extreme physical and chemical properties of this metal such as chemical reactivity, malleability, low mechanical strength, rapid self-welding by simple contact and strong adhesion on most solid materials, for example the usual metals.

This difficulty is confirmed by the difficulty of obtaining from suppliers of specialty metals and chemical products, thin lithium films 40 micrometers ($\mu$m) thick and less, of sufficient surface and length, having an adequate surface finish and chemical property to be used in lithium cells.

Presently, cold extrusion is used for the continuous production of sheets 75 $\mu$m and more. These thicknesses are generally adapted to the production of lithium cells utilizing liquid electrolytes. For lower thicknesses, the films obtained by extrusion are thereafter laminated between rollers made of hard materials. These processes have been described and are commercially used for the production of limited quantities of sheets of 30-75 microns.

U.S. Pat. No. 3,721,113, describes a process in which multiple successive lamination passes between steel rollers protected by films of hard plastic which are non reactive towards lithium are required to give thin films of 30-40 $\mu$m. U.S. Pat. No. 4,824,746 describes an alternative process based on the coating of molten lithium on a metallic of plastic support.

In large scale production processes, the difficulties in achieving the efficient lamination of dense lithium to a thickness varying between 15 and 40 microns for the production of polymer electrolyte cells are numerous: First, the laminated lithium metal often reacts with, and/or deforms, and adheres to the lamination rollers with which it is in contact. This problem has been solved by the use of a lubricating agent as described in U.S. Pat. Nos. 5,837,401, 5,528,920 and 6,019,801. The lubricating agent comprises additives which prevent the thin laminated lithium film from reacting or excessively adhering to the lamination rollers and does not effect the electrochemistry of the resulting electrochemical cell. Secondly, the extreme ductility of lithium or alloys thereof allows only minuscule drawing tension on the lithium film exiting the lamination rollers. For example, a film of lithium breaks under a drawing tension higher than 579.13 Kpa, its low limit of elasticity. The drawing tension must therefore be precisely monitored and controlled to prevent breakage or ripping of the lithium film and consequently, costly interruptions of production.

Thirdly, with a thickness between 5 to 50 microns, it is difficult to laminate a film of lithium or alloy thereof to a constant thickness across the entire width of the film. Variations of thickness occurs across the width of the laminated lithium film in conventional lamination processes which promote breakage of the lithium film during the lamination operation and renders the resulting laminated lithium film less than adequate for electrochemical cells.

Thus there is a need for a method and apparatus adapted to laminate a thin film of lithium or lithium alloy in a single pass that alleviates the limitations of the prior art and that provides a film of constant thickness.

STATEMENT OF THE INVENTION

It is therefore an object of the present invention to provide a method of laminating a lithium or lithium alloy sheet into a thin film of controlled thickness.

It is another object of the present invention to provide a lamination apparatus adapted to produce a lithium or lithium alloy thin film of controlled thickness.

As embodied and broadly described, the invention provides a method of laminating a lithium or lithium alloy sheet into a thin film, the method comprising the steps of:

applying a lamination lubricant to a sheet of lithium or lithium alloy;

passing the sheet of lithium or lithium alloy together with the lubricant between the meeting surfaces of a pair of working rollers to reduce the thickness of the sheet of lithium or lithium alloy to form a lithium or lithium alloy film of reduced thickness;

adjusting the profile defined by said meeting surfaces of said pair of working rollers to control the shape and profile of said lithium or lithium alloy film of reduced thickness being laminated; and removing said lithium or lithium alloy film of reduced thickness from between the pair of working rollers by applying a given tension to the lithium or lithium alloy film.

In a preferred embodiment, forces are applied to the end portions of the pair of working rollers such that each working roller bends thereby modifying the profile defined by their meeting surfaces. Advantageously, the working rollers have a convex cylindrical shape adapted to facilitate their bending.

As embodied and broadly described, the invention also provides an apparatus for laminating a lithium or lithium alloy sheet into a thin film, the apparatus comprising:

a lithium or lithium alloy sheet feed roller;
a lamination lubricant dispensing unit;
a pair of working rollers defining a lamination surface adapted to reduce the thickness of the sheet of lithium or lithium alloy to form a lithium or lithium alloy film of reduced thickness;
adjustment means for adjusting the profile of the lamination surface defined by the meeting surfaces of the pair of working rollers; and
a winding roll for winding said lithium or lithium alloy film of reduced thickness, the winding roll connected to a driving means for winding said film under a pre-determined tension.

In a preferred embodiment, the working rollers are mounted onto supporting members adapted to apply forces to the end portions of the working rollers such that each of the working rollers bends thereby modifying the profile of the lamination surface defined by the meeting surfaces of the working rollers.

BRIEF DESCRIPTION OF THE DRAWINGS

The invention will be better understood and other advantages will appear by means of the following description and the following drawings in which.

DETAILED DESCRIPTION

Figure 1:
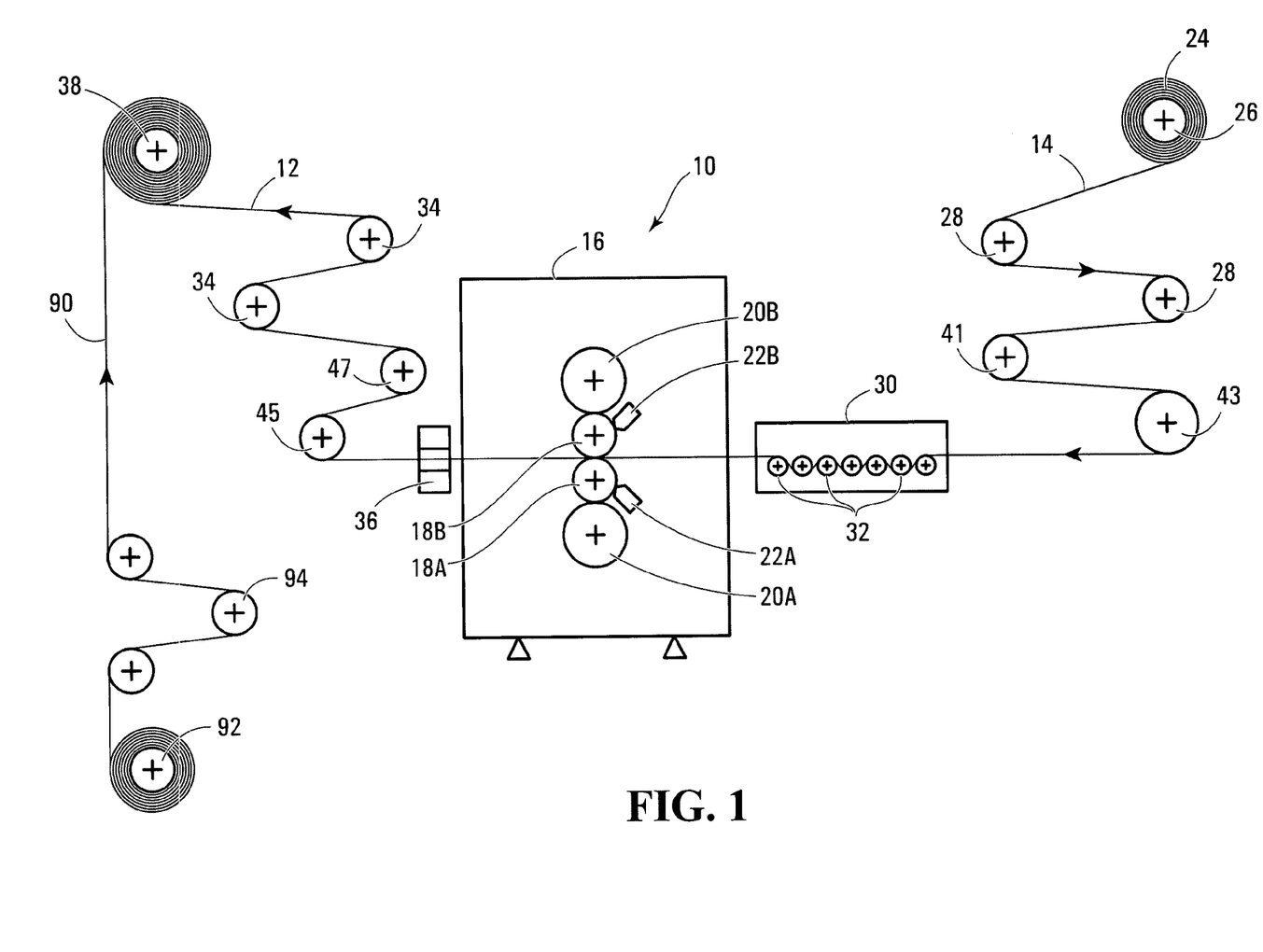
FIG. 1 is a schematic side cross-sectional view of an apparatus for laminating a lithium or lithium alloy sheet into a thin film in accordance with one embodiment of the invention.

With reference to FIG. 1, there is shown in schematic form a lamination apparatus 10 adapted to produce a lithium or lithium alloy thin film 12 of about 20 to 40 microns from a previously extruded lithium or lithium alloy sheet 14 of about 125 to 250 microns. Lamination apparatus 10 comprises a main frame 16, a pair of lamination rollers 18a and 18b, a first back-up roller 20a adjacent and in contact with lamination roller 18a, a second back-up roller 20b adjacent and in contact with lamination roller 18b and two lamination lubricant dispensing units 22a and 22b. The lamination or working rollers 18a and 18b as well as the back-up rollers 20a and 20b are mounted on support frames 50 and 52 (FIG. 3) as will be described in details further down.

A roll 24 of winded extruded lithium or lithium alloy sheet 14 is placed on a feeding roller 26 comprising an drive motor control unit (not shown) adapted to control the tension of the lithium sheet 14 prior to reaching the lamination rollers 18a and 18b. The lithium sheet 14 of about 125 to 250 microns snakes its way through a series of free rollers 28 leading to a first encoder roller 41 measuring the exact speed of the traveling lithium sheet 14, and to a first tension roller 43 equipped with a load cell adapted to precisely measure the tension on lithium sheet 14 entering the lamination apparatus 10. The load cell of tension roller 43 may be electronically coupled to the control unit of the drive motor of roll 24 to automatically adjust the tension exerted onto lithium sheet 14. Lithium sheet 14 is then fed into a straightener 30 which rapidly winds lithium sheet 14 through a series of tightly packed rollers 32 which has the effect of eliminating any lateral displacement of lithium sheet 14 and preventing any zigzagging motion of lithium sheet 14 thereby ensuring lithium sheet 14 is fed straight into the central portion of lamination rollers 18a and 18b without any lateral weaving motion that would detrimental to the lamination process. Lithium sheet 14 is therefore fed into lamination rollers 18a and 18b at a fixed position between the rollers.

At the inlet of lamination apparatus 10, lubricant dispensing units 22a and 22b discharge an adequate amount of lamination lubricant compatible with lithium onto the working surfaces of each working roller 18a and 18b upstream from the lamination area such that the lithium sheet 14 is laminated with properly lubricated working rollers 18a and 18b thereby preventing undesirable adhesion of the laminated film 12 onto either working rollers. The lubricant is fully described in U.S. Pat. Nos. 5,837,401 and 6,019,801 which are hereby incorporated by reference. The lubricant is preferably based on toluene, hexane and a polyoxyethylene distereate and is used in sufficient quantity onto each roller 18a and 18b to prevent excessive adhesion of the laminated lithium film 12 onto either of them.

Figure 3A:
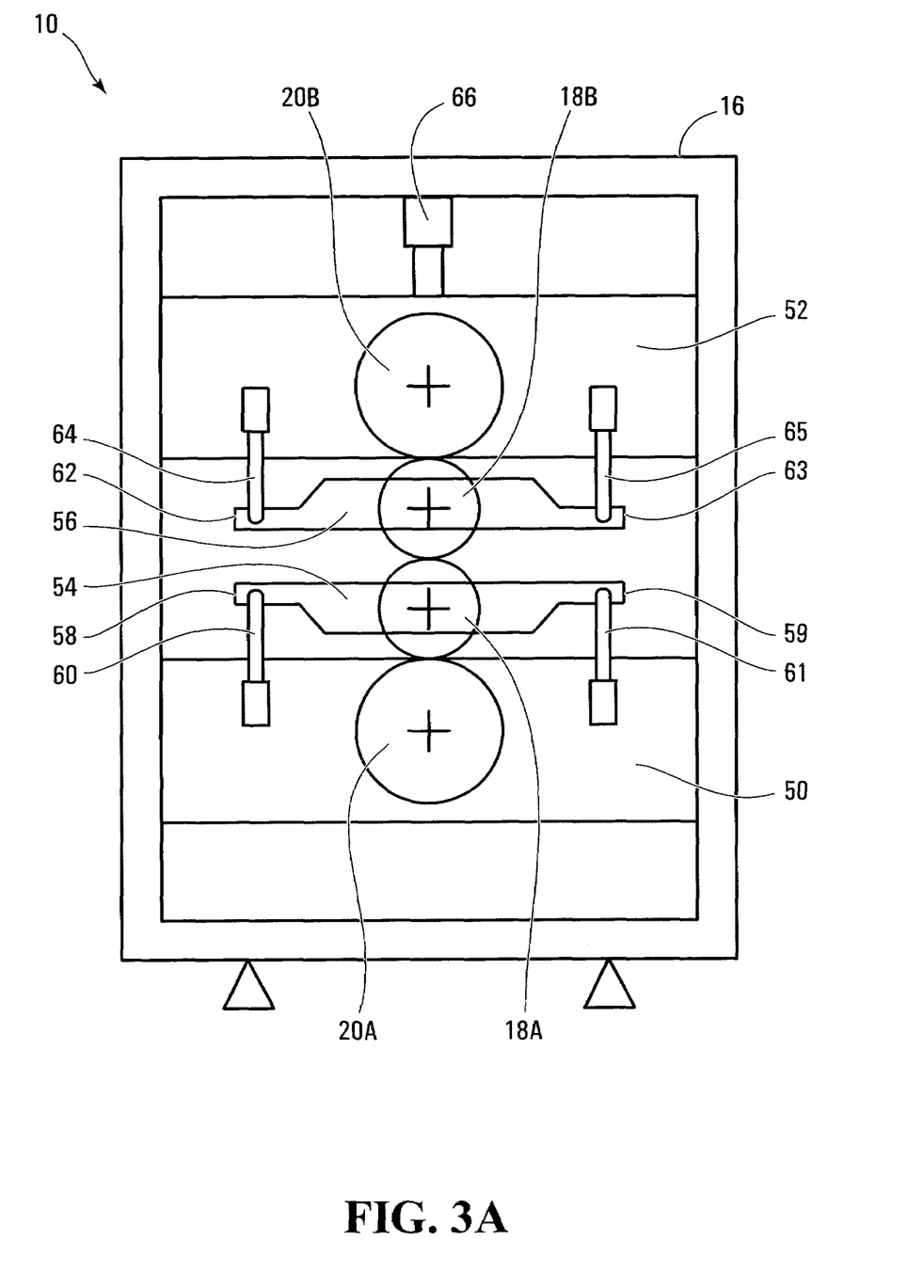
FIG. 3a is a schematic side elevational view illustrating the main components of one embodiment of the lamination apparatus shown in FIG. 1 that enable control of the thickness and shape of the lithium or lithium alloy film being laminated.

Lithium sheet 14 passes between the two working rollers 18a and 18b where its thickness is reduced from about 125 to 250 microns to about 20-40 microns. Pressure is applied by the back-up rollers 20a and 20b onto working rollers 18a and 18b which in turn exert pressure on lithium sheet 14 sufficient to reduce its thickness and transform it into a lithium film 12 of about 20-40 microns. The lamination pressure is applied through back-up rollers 20a and 20b instead of directly onto the working rollers 18a and 18b to avoid any unwanted bending of the working rollers 18a and 18b which would be reflected on the shape and thickness of the lithium film 12. Of course the surface roughness of working rollers 18a and 18b must be minimal to produce lithium thin film 12 of quality. The pressure applied by back-up rollers 20a and 20b onto the working rollers 18a and 18b is evenly distributed on the surfaces on each rollers 18a and 18b thereby leaving the shape of working rollers 18a and 18b undisturbed. If however the working rollers 18a and 18b are sufficiently rigid, the necessary pressure required to reduce the thickness of lithium sheet 14 and transform it into a lithium film 12 may be applied directly by working rollers 18a and 18b without the use of any back-up rollers (as illustrated in FIG. 3a). As well, a plurality of back-up rollers may also be used to apply even pressure on the working rollers 18a and 18b. For instance, two pairs of back-up rollers may be positioned on either side of the working rollers 18a and 18b.

As previously mentioned, the lamination lubricant dispensed onto working rollers 18a and 18b prevents adhesion of the lithium film 12 onto working rollers such that laminated lithium film 12 exits the lamination rollers 18a and 18b in a straight line. The use of lubricant enables to laminate lithium with working rollers made of material that would normally not be adequate because of their adhesion to lithium. The lubricant negates this restriction. The lamination rollers or working rollers are traditionally made of polyacetal, a hard plastic material which is compatible with lithium i.e. does not react with lithium, however for large scale production the polyacetal rollers wear out rapidly and would necessitate frequent replacement and discarding of the worn out rollers thereby drastically increasing cost rendering the lamination manufacturing process unfeasible. Therefore for large-scale production, the working rollers are preferably made of durable hard material such as steel or stainless steel cylinders or even ceramic rolls. The steel or stainless steel cylinders may have a thin coating of chrome or chrome molybdenum for added hardness.

The laminated lithium film 12 is pulled through an optical refractory system 36 which measures the evenness of the surface of the lithium film 12 and also detects any porosity on the film and cracks along the edge of the film. An optical system can also be used to measure the thickness of lithium film 12. Controlled tension is applied onto the lithium film 12 by a driven winding roller 38 to ensure lithium film 12 is properly winded. The laminated lithium film 12 snakes its way under controlled tension through a series of rollers, the first of which is a second tension roller 45 equipped with a load cell adapted to precisely measure the tension on laminated lithium film 12 exiting the lamination apparatus 10. The load cell of tension roller 45 may be electronically coupled to the control unit of the drive motor of winding roller 38 to automatically adjust the tension exerted onto lithium sheet 12. The lithium film is then winded through a second encoder roller 47 measuring the exact speed of the traveling lithium film 12. Lithium film 12 is then winded through a series of free rollers 34 leading to winding roller 38.

A thin film of insulating material such as a polypropylene film 90 is also winded around the winding roller 38 to separate the layers of lithium film 12 such that they will not adhere to each other. Insulating film 90 is pulled by winding roller 38 from a roll 92 but is first winded through a tension roller 94 equipped with a load cell adapted to precisely measure the tension on insulating film 90. This tension measurement is necessary to control the tension exerted by winding roller 38 onto lithium film 12 since the tension exerted by winding roller 38 is divided between the lithium film 12 and the insulating film 90.

The first and second encoder rollers 41 and 47 respectively measure the speed of the lithium sheet 14 entering the lamination apparatus 10 and the speed of the laminated lithium film 12 exiting the lamination apparatus 10. The relation between the inlet speed of lithium sheet 14 and the outlet speed of laminated lithium film 12 is directly proportional to the thickness reduction of the initial lithium sheet 14 into lithium film 12 such that the thickness of the laminated lithium film 12 may be deducted through a simple mathematical equation when the thickness of the initial lithium sheet 14 is known. The thickness of the laminated lithium film 12 is preferably controlled and verified through the speed differential between first and second encoder rollers 41 and 47.

The lamination process is preferably carried out in an anhydride atmosphere containing less than 1% relative humidity to prevent any unwanted chemical reactions of the lithium film 12 with water particles that would render the lithium film 12 unsuitable for use in electrochemical cells.

Figure 2A:
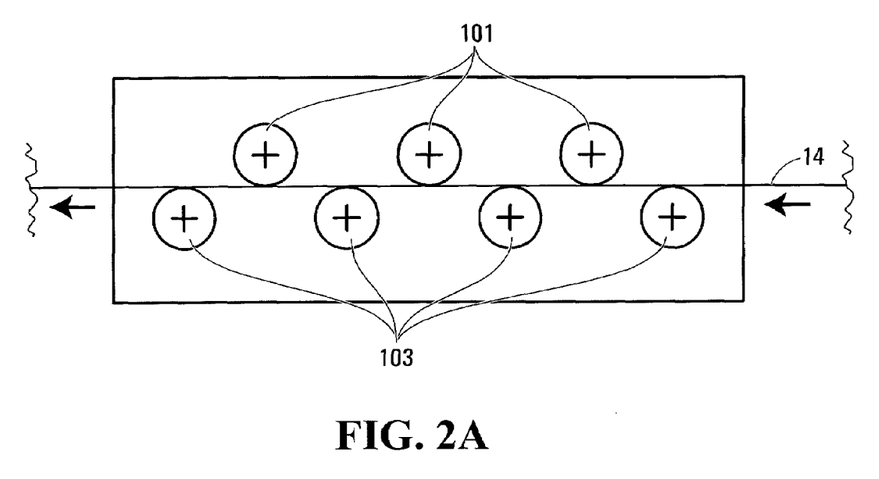
FIGS. 2a and 2b illustrate a straightener adapted to control the lateral motion of a lithium sheet fed into the lamination apparatus of FIG. 1.
Figure 2B:
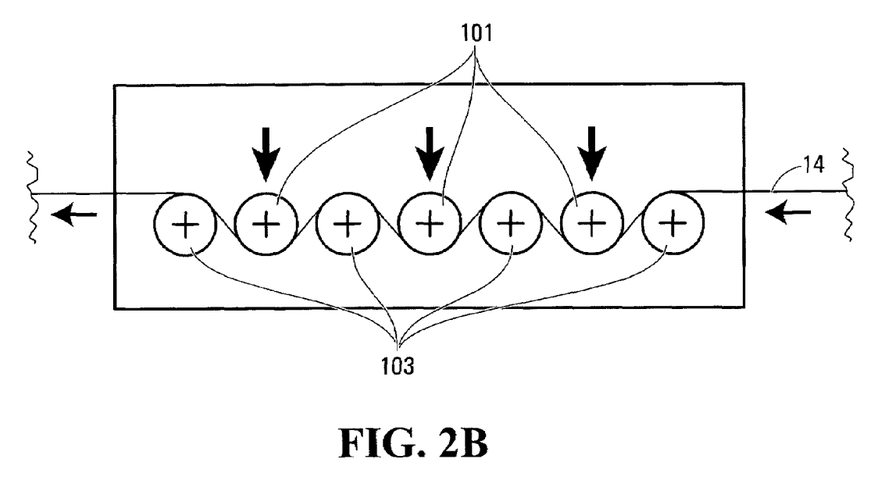

FIGS. 2a and 2b illustrate how the lithium sheet 14 is winded through straightener 30. Lithium sheet 14 is fed between upper rollers 101 and lower rollers 103 prior to lamination. The lamination apparatus is then started; the lithium sheet 14 starts traveling and the upper rollers 101 are slowly moved into the free spaces between each lower rollers 103 thereby winding lithium sheet 14 through a tightly packed series of rollers, which prevent lateral displacement and zigzagging motion of lithium sheet 14 thereby ensuring lithium sheet 14 is fed straight into the central portion of lamination rollers 18a and 18b without any lateral weaving motion. The upper rollers 101 and lower rollers 103 may be made of stainless steel, chrome plated, or hard plastic, acetal and ® Delrin.

Figure 3B:
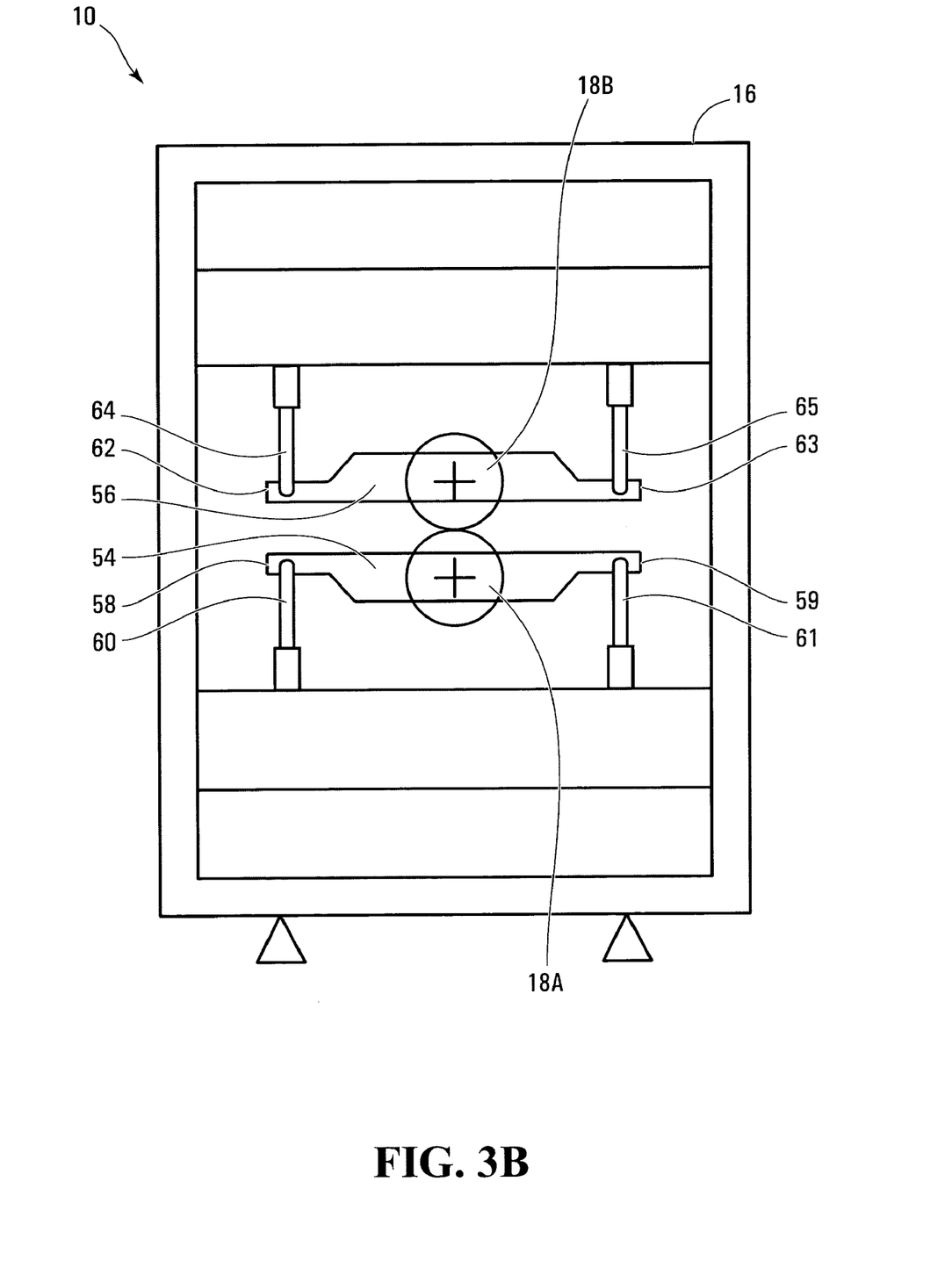
FIG. 3b is a schematic side elevational view illustrating a second embodiment of the lamination apparatus shown in FIG. 1.
Figure 4:
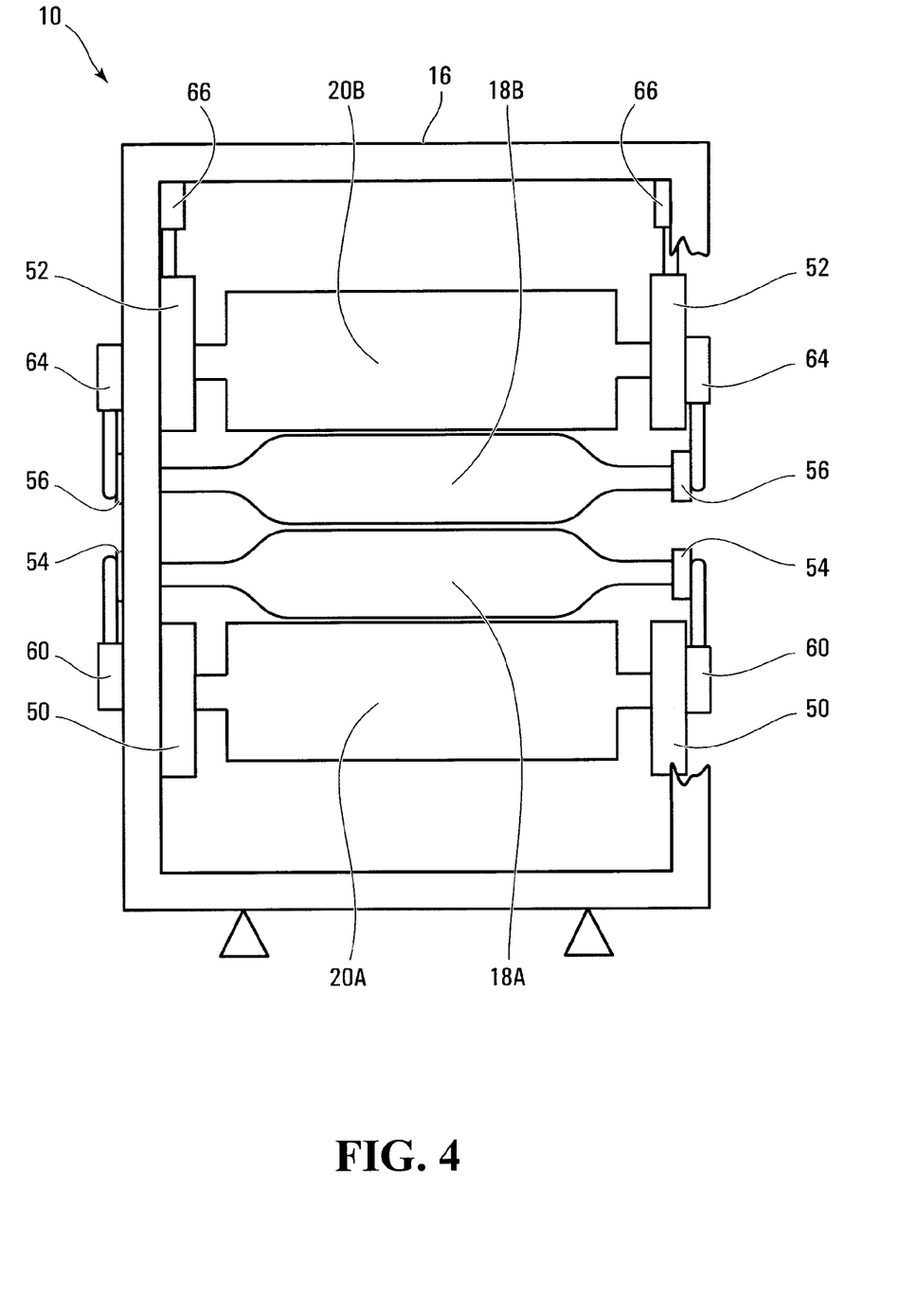
FIG. 4 is a schematic front elevational view of the main components of the lamination apparatus illustrated in FIG. 3.

FIGS. 3 and 4 are respectively schematic side elevation and front elevation views of one embodiment of the lamination apparatus 10 and illustrates the main components of the lamination apparatus 10 that enable control of the thickness and shape of the lithium film 12 being laminated specifically the mountings of back-up rollers 20a and 20b and of working rollers 18a and 18b and their adjustment means. It is to be understood that the illustrated lamination apparatus 10 is only one example of many different possible configurations of a lamination apparatus adapted to control the shape and thickness of the laminated lithium film. For instance, support members and frames may have different configurations. As well, various hydraulic system configurations may be used with lamination apparatus 10 without departing from the scope and spirit of the invention.

With reference to FIGS. 3 and 4, back-up rollers 20a and 20b are each mounted on bearings of support frame 50 and 52 respectively. Support frame 52 is slideably mounted onto the vertical members of the main frame 16 through any suitable means such as sliding channels or bearings as is well known in the art whereas support frame 50 is fixedly mounted onto the vertical members of the main frame 16. Support frame 52 may therefore freely move vertically. Working rollers 18a and 18b are each driven by electric or hydraulic motors (not shown) which also drive by friction back-up rollers 20a and 20b. A pair of hydraulic piston-cylinders 66 is mounted to the upper horizontal member of main frame 16 and connected to support frame 52 while support frame 50 is fixed. Piston-cylinder 66 controls the up and down movements of support frame 52, as well as the pressure P being applied onto the working rollers 18a and 18b. Working rollers 18a and 18b are respectively mounted onto supporting members 54 and 56, which are free-floating and operationally linked to support frames 50 and 52. The end portions 58 and 59 of supporting member 54 are operatively connected to support frame 50 via a pair of hydraulic piston-cylinder assembly 60 and 61 and the end portions 62 and 63 of supporting member 56 are operatively connected to support frame 52 via a pair of hydraulic piston-cylinder assembly 64 and 65.

In operation, the speed of lamination is set by the speed of working rollers 18a and 18b and the pressure P necessary to reduce the thickness of lithium film 12 to the desired thickness is adjusted through hydraulic valves controlling the debit of fluid into piston-cylinder 66, back-up roller 20b transferring this pressure P onto working roller 18b. Once the desired pressure P is set, the final shape of laminated lithium film is fine tuned by regulating the fluid pressure to each piston-cylinders assemblies 60, 61, 64 and 65 thereby adjusting the forces exerted by each piston-cylinders assemblies 60, 61, 64 and 65 onto supporting members 54 and 56 as will be explained in more details with references to FIGS. 5a to 5c and 6a to 6c. for the purpose of the invention, piston-cylinders assemblies may be replaced by any type of actuator capable of generating sufficient forces such as electric actuators.

During the lamination process, heat builds up into working rollers 18a and 18b through friction generated at the lamination surfaces with the effect of slightly dilating the working rollers 18a and 18b. The dilation of the working rollers by a few microns in the lamination zone is enough to produce a lithium film 12 of uneven thickness that is unsuitable for thin film electrochemical cells. To alleviate this problem and ensure a lithium film 12 of even thickness, the contact surfaces 67 of the dilated working rollers 18*a* and 18*b* is adjusted by bending working rollers 18*a* and 18*b* to straighten contact surfaces 67 and produce an even thickness lithium film 12.

Figure 5A:
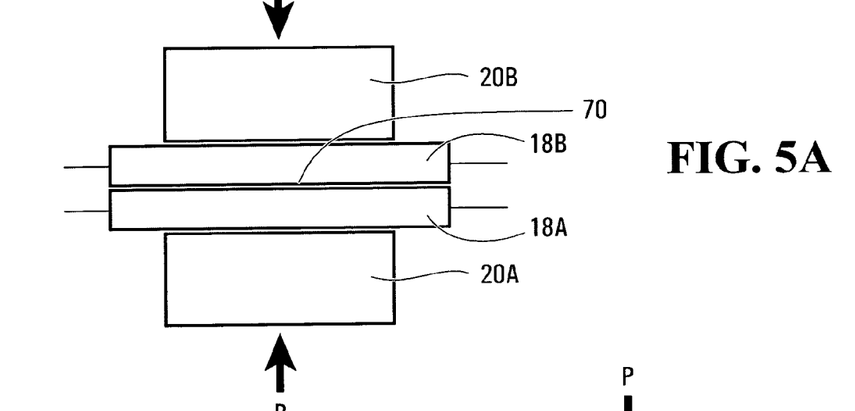
FIGS. 5a to 5c are schematic front elevational views of a first embodiment of the working rollers and their adjustments.

FIG. 5*a* is a schematic front view of working rollers 18*a* and 18*b* and back-up rollers 20*a* and 20*b* in the neutral position according to a first embodiment in which working rollers 18*a* and 18*b* are linear cylinders. Back-up rollers 20*a* and 20*b* apply a pressure P onto working rollers 18*a* and 18*b* sufficient to reduce the thickness of lithium film 12 to the desired thickness while no lateral force is applied to the supporting members 54 and 56 of working rollers 18*a* and 18*b* which remain perfectly flat and even, their meeting surfaces defining a similarly flat and even lamination surfaces 70.

Figure 5B:
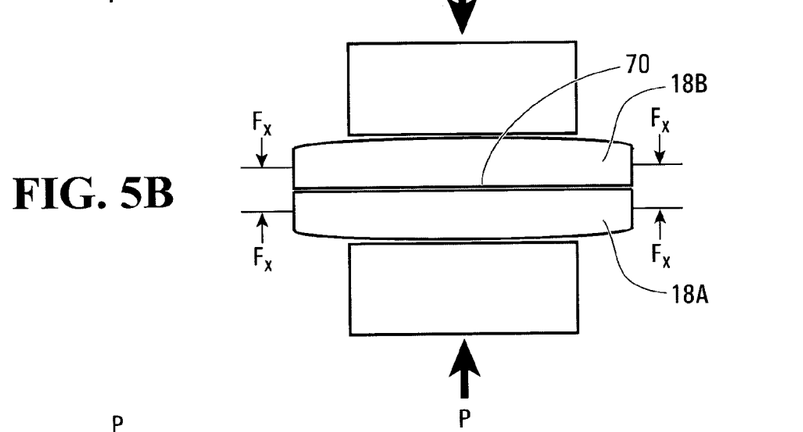

In FIG. 5*b*, back-up rollers 20*a* and 20*b* still apply a pressure P onto working rollers 18*a* and 18*b* sufficient to reduce the thickness of lithium film 12 to the desired thickness however, the central portion of working rollers 18*a* and 18*b* are dilated through heat build-up generated by friction of the lamination surfaces against the lithium sheet. To compensate this heat dilation which has deformed working rollers 18*a* and 18*b*, inwardly oriented lateral forces Fx are applied to the supporting members 54 and 56 thereby slightly bending working rollers 18*a* and 18*b* outwardly, marginally opening the central portion of the lamination surfaces 70 and straightening it. In FIG. 5*b*, the outer portion of the cylinders 18*a* and 18*b* is shown as bent outwardly such that the lamination surfaces 70 is bent into a straight line by the applied lateral forces Fx on the working rollers 18*a* and 18*b*. The profile of the central portion of the lamination surfaces 70 has been bent back into a straight line such that the resulting laminated lithium film 12 will have an even thickness throughout its entire width.

At times, the edges of the lithium sheet 14 being laminated are thicker than its central portion. In order to laminate a lithium film 12 having an even thickness throughout its width, more pressure must be applied by working rollers 18*a* and 18*b* to the outside edges of the lithium sheet 14. To do so, the same lateral forces Fx are applied to the supporting members 54 and 56 thereby slightly bending the outer edges of working rollers 18*a* and 18*b* inwardly, and applying more pressure to the edges of lithium sheet 14 than its central portion such that the laminated lithium film 12 has an even thickness throughout its width. As heat build-up in the central portion of the working rollers 18*a* and 18*b* through friction of the lamination surfaces against the lithium sheet, the central portion of working rollers 18*a* and 18*b* dilate marginally. To compensate this heat dilation which is increasing the diameters of the central portion of working rollers 18*a* and 18*b*, the lateral forces Fx are proportionally reduced to maintain lamination surfaces 70 into a straight line such that the resulting laminated lithium film 12 will have an even thickness throughout its entire width.

Figure 5C:
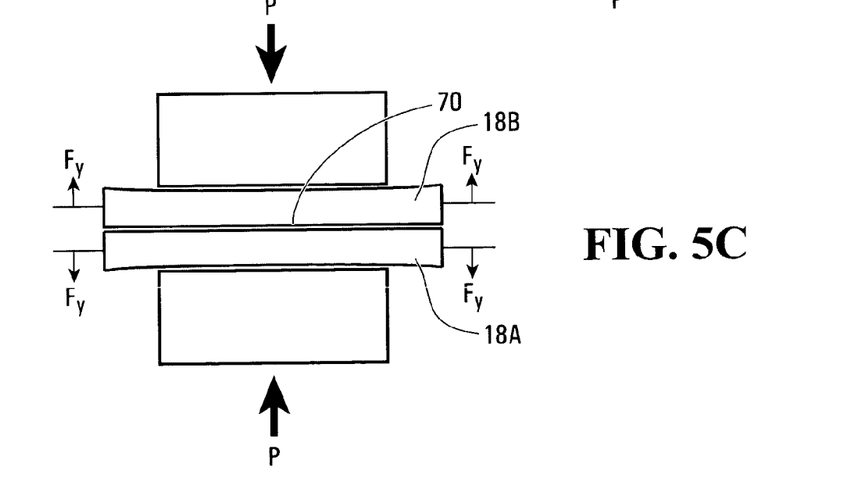

At times, it is the central portion of the lithium sheet 14 being laminated that is thicker than its edges. In order to laminate a lithium film 12 having an even thickness throughout its width, more pressure must be applied by working rollers 18*a* and 18*b* onto the central portion of the lithium sheet 14. As shown in FIG. 5*c*) to do so, outwardly oriented lateral forces Fy are applied to the supporting members 54 and 56 of working rollers 18*a* and 18*b*. Lateral forces Fy slightly bend the central portion of working rollers 18*a* and 18*b* inwardly forcing the central portion of the lamination surfaces 70 towards each other thereby applying more pressure onto the central portion of the lithium sheet 14 and laminating a lithium film 12 having an even thickness throughout its entire width.

In rare circumstances, heat generated by the friction of the lamination surfaces against the lithium sheet will build up in the outside portions of working rollers 18*a* and 18*b* and dilate them, opening a small gap in the central portion of laminated surfaces 70. To compensate this heat dilation, outwardly oriented lateral forces Fy are applied to the supporting members 54 and 56 of working rollers 18*a* and 18*b*. Lateral forces Fy slightly bend the central portion of working rollers 18*a* and 18*b* inwardly forcing the central portion of the lamination surfaces 70 towards each other and straightening lamination surfaces 70. In FIG. 5*c*, the outer portions of the cylinders 18*a* and 18*b* are shown as bent inwardly such that the lamination surfaces 70 are bent into a straight line. The profile of the central portion of the lamination surfaces 70 is bent back into a straight line such that the resulting laminated lithium film 12 will have an even thickness throughout its entire width.

Please note that the shapes of working rollers 18*a* and 18*b* as illustrated in FIGS. 5*b* and 5*c* are greatly exaggerated for the sake of clarity but the bent profiles are in fact invisible to the naked eye and represent 0-10 microns deviations from a perfectly linear profile.

Figures 6A, 6B:
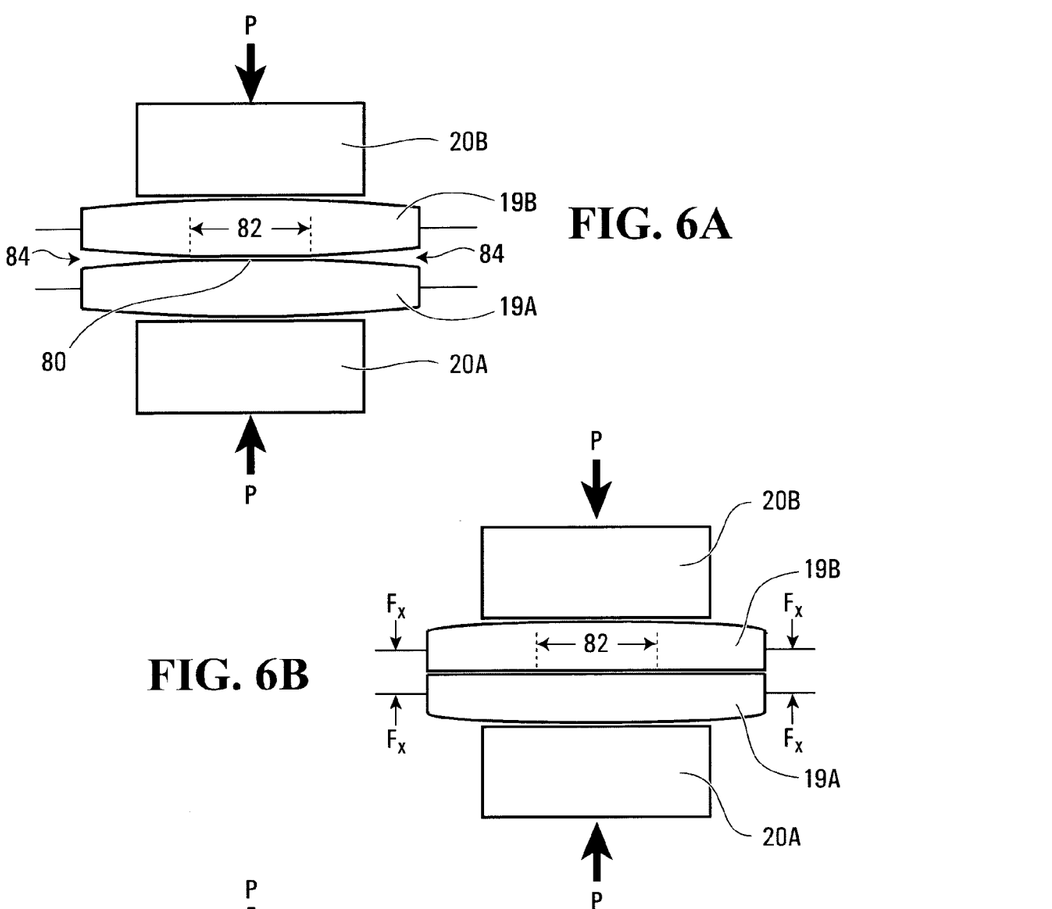
FIGS. 6a to 6c are schematic front elevational views of a second embodiment of the working rollers and their adjustments.
Figure 6C:
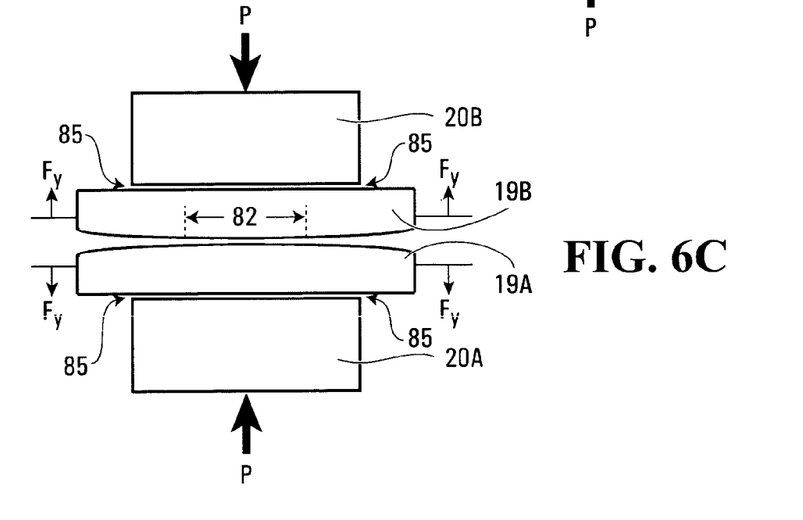

FIGS. 6*a*, 6*b*, and 6*c* are schematic front views of working rollers 19*a* and 19*b* and back-up rollers 20*a* and 20*b* according to a second embodiment in which working rollers 19*a* and 19*b* are curvilinear cylinders. Working rollers 19*a* and 19*b* have slightly convex profiles such that the meeting surfaces 80 of the rollers defined a lamination segment 82 a few millimeters wider than the width of the lithium film 12 being laminated. Because of the curvilinear design, the end portions of the working rollers 19*a* and 19*b* are slightly more spaced apart than those of working rollers 19*a* and 19*b* which facilitates the inward and outward bending of working rollers 19*a* and 19*b*.

FIG. 6*a* illustrates working rollers 19*a* and 19*b* in the neutral position. Back-up rollers 20*a* and 20*b* apply a pressure P onto working rollers 19*a* and 19*b* sufficient to reduce the thickness of lithium film 12 to the desired thickness while no lateral force is applied to the supporting members 54 and 56 of working rollers 19*a* and 19*b*. The lamination segment 82 therefore remains perfectly flat and even.

In FIG. 6*b*, back-up rollers 20*a* and 20*b* still apply a pressure P onto working rollers 19*a* and 19*b* sufficient to reduce the thickness of lithium film 12 to the desired thickness. However, due to thermal dilation, the central portion of working rollers 19*a* and 19*b* have expanded through heat build-up generated by friction of the lamination surfaces against the lithium sheet. To compensate this heat dilation which has deformed working rollers 19*a* and 19*b*, inwardly oriented lateral forces Fx are applied to the supporting members 54 and 56 of working rollers 19*a* and 19*b*. Lateral forces Fx slightly bend working rollers 19*a* and 19*b* outwardly thereby flattening the central portion of the lamination segment 82 as depicted in FIG. 6*b*. The outside edges of working rollers 19*a* and 19*b* are bent inwardly to straighten the lamination segment 82. The resulting laminated lithium film 12 will therefore be flat and have an even thickness. The convex profiles of working rollers 19*a* and 19*b* facilitates their bending by providing free zones 84 where the end portions of working rollers 19*a* and 19*b* may freely recede to bend the central portion of the lamination segments 82 as desired.

As previously described, at times, the edges of the lithium sheet 14 being laminated are thicker than its central portion. In order to laminate a lithium film 12 having an even thickness throughout its width, more pressure must be applied by working rollers 19a and 19b to the outside edges of the lithium sheet 14 and therefore to the outer edges of lamination segment 82. To do so, the same lateral forces Fx are applied to the supporting members 54 and 56 thereby Slightly bending the outer edges of working rollers 19a and 19b inwardly, and applying more pressure to the edges of lithium sheet 14 than its central portion such that the laminated lithium film 12 has an even thickness throughout its width. As heat build-up in the central portion of the working rollers 19a and 19b through friction of the lamination surfaces against the lithium sheet, the central portion of working rollers 19a and 19b dilate marginally. To compensate for this heat dilation which is marginally increasing the diameters of the central portion of working rollers 19a and 19b, the lateral forces Fx are proportionally reduced to maintain lamination segment 82 into a straight line such that the resulting laminated lithium film 12 will have an even thickness throughout its entire width.

Again as previously described with reference to FIG. 5c, at times, it is the central portion of the lithium sheet 14 being laminated that is thicker than its edges. In order to laminate a lithium film 12 having an even thickness throughout its width, more pressure must be applied by working rollers 19a and 19b onto the central portion of the lithium sheet 14 and therefore to the central portion of lamination segment 82. As shown in FIG. 6c, to do so, outwardly oriented lateral forces Fy are applied to the supporting members 54 and 56 of working rollers 19a and 19b. Lateral forces Fy slightly bend the central portion of working rollers 19a and 19b inwardly forcing the central portion of the lamination segment 82 inwardly thereby applying more pressure onto the central portion of the lithium sheet 14 and laminating a lithium film 12 having an even thickness throughout its entire width.

In rare circumstances, heat generated by the friction of the lamination surfaces against the lithium sheet will build up in the outside portions of the meeting surfaces 80 or working rollers 19a and 19b and dilate them, opening a small gap in the central portion of laminated segment 82. To compensate this heat dilation, outwardly oriented lateral forces Fy are applied to the supporting members 54 and 56 of working rollers 19a and 19b. Lateral forces Fy slightly bend the central portion of working rollers 19a and 19b inwardly forcing the central portion of the lamination segment 82 inwardly and straightening lamination segment 82. In FIG. 6c, the outer portions of the cylinders 19a and 19b are shown as bent inwardly such that the lamination segment 82 is reshaped into a straight line. The profile of the central portion of the lamination segment 82 is bent back into a straight line such that the resulting laminated lithium film 12 will be flat and have an even thickness throughout its entire width.

The convex profiles of working rollers 19a and 19b facilitates their bending by providing free zones 84 and 85 between the end portions of working rollers 19a and 19b and between the end portions of working rollers 19a and 19b and back-up rollers 20a and 20b such that the end portions of working rollers 19a and 19b may freely recede to bend the central portion of the lamination segment 82 as desired.

Of course, only the symmetrical adjustments have been shown in FIGS. 5b, 5c, 6b and 6c however because supporting members 54 and 56 are independent from each other, other adjustments are possible. For instance, if the working rollers dilate more on one side than the other, the left or the right supporting members may have a force Fx or Fy exceeding the force Fx or Fy of the supporting members on the opposite side such that a multitude of fine tuning adjustments are possible.

The adjustments of the shape of lamination segment 82 or of lamination surfaces 80 combined with the precise measurements of an adequate measuring device such as optical refractory system 36 enables the lamination apparatus 10 to produce a laminated lithium film 12 of superior quality in the range of thickness from 5 to 60 microns that exhibits a near constant thickness throughout its entire length and width.

As previously mentioned If the working rollers 18a and 18b or 19a and 19b are sufficiently rigid, the necessary pressure required to reduce the thickness of lithium sheet 14 and transform it into a lithium film 12 may be applied directly by the working rollers without the use of any back-up rollers as illustrated in FIG. 3a. Heat build-up in the central portion of the working rollers is compensated in similar fashion as described above by adjusting the lateral forces Fx to control the profile of the central portion of the working rollers by bending them back into a straight line such that the resulting laminated lithium film 12 will be flat and have an even thickness throughout its entire width.

The adjustments of the profile and thickness of laminated lithium film 12 may either be performed by an operator on site that fine tunes the pressures applied by back-up rollers 20a and 20b and the pressures applied to the supporting members 54 and 56 to adjust the shape of lamination surfaces 70 or lamination segment 82 or this task may be performed electronically by linking the measurement readings and the actuators (electrical or hydraulic) controlling the various pressures and forces of the back-up rollers and the working rollers to a computer providing instant adjustments of theses parameters through a program specifically written for this purpose as is well known in the art.

Although the present invention has been described in relation to particular variations thereof, other variation and modifications are contemplated and are within the scope of the present invention. Therefore the present invention is not to be limited by the above description but is defined by the appended claims.

We claim:

1. An apparatus for laminating a lithium or lithium alloy sheet into a thin film, said apparatus comprising:
   a main frame;
   a lithium or lithium alloy sheet feed roller;
   a first encoder roller adapted to measure a speed of the lithium or lithium alloy sheet at an entrance of the lamination apparatus;
   a first tension roller having a load cell adapted to measure the tension on the lithium or lithium alloy sheet at the entrance of the lamination apparatus;
   a lamination lubricant dispensing unit;
   a pair of working rollers mounted onto supporting members operatively connected to the main frame via hydraulic actuators, each working roller of the pair of working rollers having end portions and a generally convex curvilinear cylindrical shape including a flat central portion; the meeting surfaces of the flat central portions of the pair of working rollers defining a lamination surface adapted to reduce the thickness of the sheet of lithium or lithium alloy to form a lithium or lithium alloy film of reduced thickness;
   at least one actuator operatively connected to each end portion of each working rollers
   a measurement system for measuring the evenness of the thickness of the lithium or lithium alloy film of reduced thickness; the actuators being linked to the optical measurement system for adjusting the profile of the lamination surface in response to measurement of the measurement system by applying forces to the end portions of the working rollers such that each said working rollers bends thereby modifying the shape and profile of said lithium or lithium alloy film of reduced thickness being laminated;

a second encoder roller adapted to measure the speed of the lithium or lithium alloy film of reduced thickness at an exit of the lamination apparatus; wherein the thickness of the lithium or lithium alloy film of reduced thickness is determined by a speed differential between the first and second encoder roller;

a second tension roller having a load cell adapted to measure the tension on the lithium or lithium alloy film of reduced thickness at the exit of the lamination apparatus; and;

a winding roll for winding the lithium or lithium alloy film of reduced thickness, said winding roll connected to a driving means, the driving means responsive to signals from the load cell of the second tension roller for winding the lithium or lithium alloy film of reduced thickness under a controlled tension.

2. An apparatus as defined in claim 1 further comprising a pair of back-up rollers operatively mounted to the main frame, each back-up roller adjacent and in contact with one of the pair of working rollers and adapted to apply pressure onto the adjacent working roller.

3. An apparatus as defined in claim 1 wherein the actuators are hydraulic piston-cylinders adapted to generate a necessary force to bend said working rollers.

4. An apparatus as defined in claim 3 wherein adjustment of pressure and forces is provided through hydraulic control valves adapted to regulate hydraulic fluid debit.

5. An apparatus as defined in claim 1 wherein hydraulic piston-cylinders are mounted onto support frames to which are mounted said back-up rollers.

6. An apparatus as defined in claim 1 further comprising a straightener having a series of tightly packed upper rollers and lower rollers adapted to eliminate any lateral displacement of said lithium or lithium alloy sheet thereby ensuring said lithium or lithium alloy sheet is fed straight into said lamination surface without any lateral weaving motion.

7. An apparatus as defined in claim 1 further comprising a thin film of insulating material which is winded around the winding roller to separate layers of lithium or lithium alloy film such that they will not adhere to each other.

8. An apparatus as defined in claim 1, wherein the actuators are operatively connected to the supporting members of the working rollers.

9. An apparatus as defined in claim 8, wherein a pair of actuators is operatively connected to each supporting member of the working rollers.

* * * * *